United States Patent [19]
Gibbons

[11] Patent Number: 4,582,152
[45] Date of Patent: Apr. 15, 1986

[54] WEIGHING MECHANISM
[75] Inventor: Donald Gibbons, Danbury, Conn.
[73] Assignee: Armour Pharmaceutical Co., Tarrytown, N.Y.
[21] Appl. No.: 645,449
[22] Filed: Aug. 29, 1984
[51] Int. Cl.[4] .................. G01G 3/14; G01G 3/08; G01G 23/32
[52] U.S. Cl. .................. 177/210 C; 177/229; 177/DIG. 9; 177/178
[58] Field of Search ............. 177/210 C, 229, DIG. 9, 177/178

[56] References Cited
U.S. PATENT DOCUMENTS

| | | |
|---|---|---|
| 2,739,806 | 3/1956 | Stelzer . |
| 2,793,026 | 5/1957 | Giardino et al. . |
| 3,000,101 | 9/1961 | Giardino et al. . |
| 3,082,834 | 3/1963 | Ellis .................. 177/229 X |
| 3,181,851 | 5/1965 | Troeger .................. 177/DIG. 9 |
| 3,590,933 | 7/1971 | Forman .................. 177/178 X |
| 3,709,311 | 1/1973 | Appius .................. 177/DIG. 9 |
| 3,986,571 | 10/1976 | Strobel et al. . |
| 4,062,417 | 12/1977 | Kunz . |
| 4,191,268 | 4/1980 | Miyoshi et al. . |
| 4,273,204 | 6/1981 | Gillen . |
| 4,273,205 | 6/1981 | De Voogd . |
| 4,300,647 | 11/1981 | Knothe et al. . |
| 4,308,929 | 1/1982 | Estavoyer .................. 177/229 X |
| 4,333,496 | 8/1982 | Langlais et al. . |
| 4,341,275 | 7/1982 | Stadler et al. . |
| 4,401,173 | 8/1983 | Komoto . |
| 4,519,464 | 5/1985 | Stuart .................. 177/210 C X |

FOREIGN PATENT DOCUMENTS

0517788 1/1931 Fed. Rep. of Germany ...... 177/229

Primary Examiner—George H. Miller, Jr.
Attorney, Agent, or Firm—Scully, Scott, Murphy & Presser

[57] ABSTRACT

The specification discloses a balance for measuring a load. This balance uses an electronic or optical transducer and a parallelogram support for the load to be weighed. The parallelogram linkage uses one or more torsion bars to resiliently support the load, wherein the deflection of the parallelogram is proportional to the weight of the load. When used with a capacitance transducer, the parallelogram linkage also enables the capacitor plates to remain parallel to one another as the parallelogram is loading, thereby producing a signal that can be electronically processed to provide a liner digital read out signal on indication of weight. Electronic data processing means as provided to calculate and display on indication of weight and/or volume. An optional opitcal indicator means is also disclosed to provide an optical reading of the weight of the load.

15 Claims, 9 Drawing Figures

WEIGHING MECHANISM

FIELD OF THE INVENTION

The present invention is applicable to the field of balances or scales for measuring the weight and if the density of the substance is known, the volume of a quantity to be measured. The device in its preferred embodiment can provide continuous digital electronic readout and is therefore applicable to process flow environments.

BACKGROUND OF THE INVENTION

The use of a capacitance transducer in an electronic balance is well known in the art. The combination of a parallelogram linkage with a capacitance transducer is also well known in the art. A parallelogram linkage is particularly suited for use with the capacitance transducer inasmuch as the parallelogram linkage enables the plates of the capacitor to be maintained parallel to one another as the parallelogram and linkage is deflected.

U.S. Pat. No. 4,344,496 discloses an integral parallelogram load receiver having a parallelogram and a capacitance transducer. FIG. 1 of this patent discloses a circular device having four constrictions which form the hinges of a deformable parallelogram. As the parallelogram is deformed, the capacitance plates 40 and 44 provide a capacitance value that is inversely proportional to the spacing of the capacitance plates. The resilient spring for the device which supports the load to be weighed is formed by the constrictions 22, 24, 26, and 28.

U.S Pat. No. 2,793,026 discloses a spring balance for rapid continuous dosing or controlling that is suitable for process control applications. A pair of parallelogram linkages are provided to compensate for vibration of the supporting structure. The capacitance plates 6, 7 define an electronic transducer measuring the loads supported by pan 11. An adjustable coil spring 8 is used to support the parallelogram, and to offset the load to be measured.

U.S. Pat. No. 3,701,009 discloses in FIG. 4 an electromechanical transducer using a modified parallelogram linkage wherein the spring arms 95 define two sides of the parallelogram, and provide a resilient spring for offsetting the load to be received by member 97a.

U.S. Pat. Nos. 2,739,806 and 4,273,205 disclose balances that utilize a torsion bar member as part of the balance. In these two devices, however, the torsion bar is not combined with a parallelogram linkage or with a capacitance transducer.

OBJECTS OF THE INVENTION

It is an object of the present invention to provide a parallelogram support means for a weighing mechanism which has one side thereof fixed as a base member, an opposite side as a reciprocating member, with the base member and reciprocating member joined by two movable connecting links and four pivotable joints. Each of the pivotable joints has a torsion bar mounted therein for supporting the load to be weighed.

It is a further object of the present invention to provide a plurality of torsion bars joining the links of a parallelogram, wherein the spring deflection rate for the load to be measured is linearly proportional to the weight of the load.

It is a further object of the present invention to provide a means for converting the deflection of the reciprocating member into an electronic signal that will be linearly proportional to the weight of the load.

It is a further object of the present invention to provide a weighing mechanism utilizing a capacitance transducer and a parallelogram support means to maintain the capacitor plates parallel to one another as a load receiving means is deflected by the load.

It is a further object of the present invention to provide a means for optically determining the deflection of the reciprocating member so that the reading of the deflection can be viewed through an eyepiece or other means so that an operator can see the deflection.

It is a further object of the present invention to provide an accurate, inexpensive weighing mechanism for use in measuring the weight, and therefore the volume of a fluid being measured.

It is another object of the present invention to determine the volume of fluid collected with respect to time. By using an astable multivibrator and microprocessor, a pulse train may be generated that is directly proportional (in frequency) to the weight of the fluid and hence, the volume.

Both the rate of the fluid collected as well as the total amount of fluid collection can be monitored by the same microprocessor, monitoring a single pulse train.

DETAILED DESCRIPTION OF THE PREFERRED EMBODIMENTS

The present invention is particularly adapted for commercial, industrial or scientific applications where a high degree of precision is required. The present invention can provide a high degree of precision because there are no bearings or other pivots that would cause friction and the accompanying loss of precision due to overcoming this friction as the load is applied.

In addition to a relatively high degree of accuracy for commercial scales, the scale mechanism is also simple in operation, durable in construction, and economical to construct.

Figure 1:
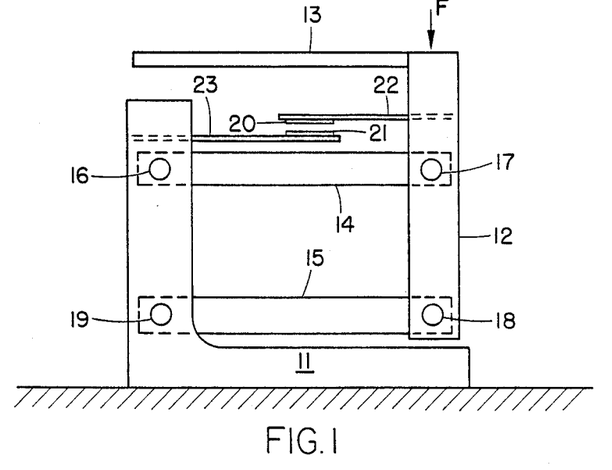
FIG. 1 is a diagrammatic view of one embodiment a weighing mechanism constructed in accordance with the teachings of the present invention.

As illustrated in FIG. 1, a parallelogram support means is provided for supporting a load to be measured, and to translate the deflection due to said load into linear movement for the plates in a capacitor or other transducer means.

The parallelogram is supported by ridged support means or base member 11 which is illustrated in the FIG. 1 as a vertical support. This may be a wall surface or a plate to be mounted on a vertical wall surface. The opposite side of the parallelogram is a movable link 12 which reciprocates vertically in response to a loading F placed on the cantilevered load receiver 13. The vertically reciprocating link 12 and the support member 11 are connected by a pair of movable connecting links 14, 15 and four torsion bars located at each of four pivotable joints 16-19. Capacitor plate 20 is attached to the vertically reciprocating link 12 by means of horizontal support member 22. Capacitor plate 21 is attached to the vertical base member by means of a second horizontal support member 23.

When a load to be measured is placed in the load receiver 13, a force F is generated, deflecting the vertically reciprocating member 12 downwardly as indicated by the arrow X in FIG. 1. The downward loading of the force F is resisted by the torsion bars located at the pivotable joints 16-19. As illustrated in FIG. 1, as the vertically reciprocal link 12 is moved downward by the load, the capacitor plates 20, 21 are brought closer together, thereby increasing the capacitance of the transducer means.

Figure 2:
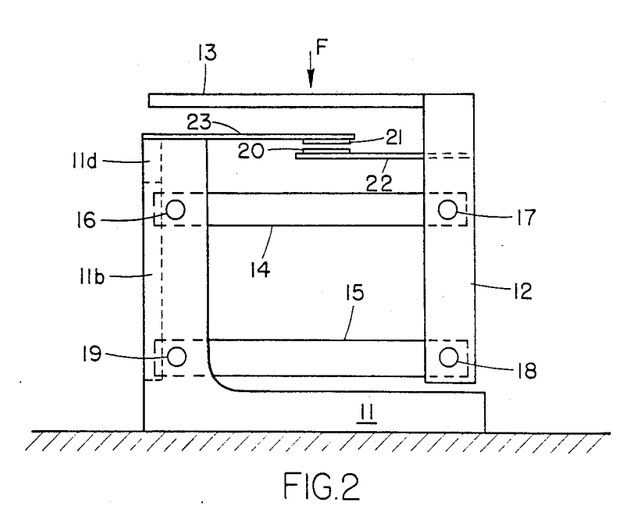
FIG. 2 is side elevation view of a preferred embodiment of the present invention.

As illustrated in FIG. 2, the arrangement of the horizontal support means 22, 23 and the capacitor plates 20, 21 have been reversed to provide for a reduction in capacitance in response to the load F placed on the load receiving member 13.

Figure 4:
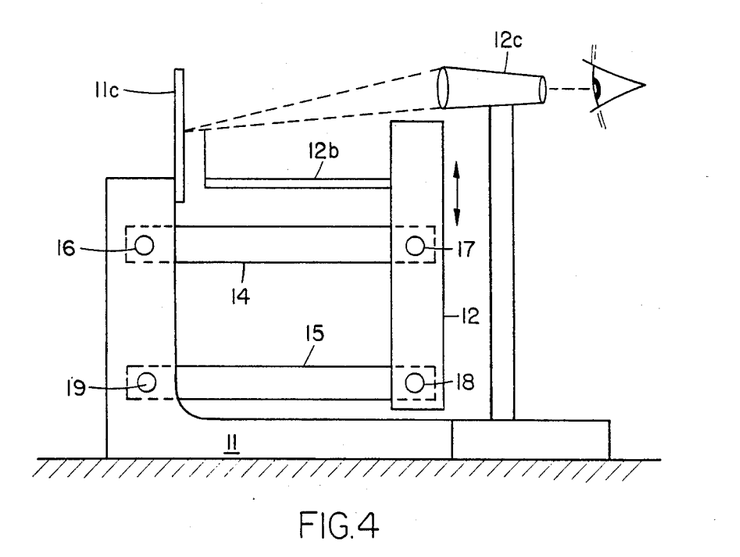
FIG. 4 is side elevation view of a fourth embodiment of the present invention.

As illustrated in FIG. 4 a scale 11c, with suitable increments is fixed to the base member 11 and a suitable pointer 12b is fixed to the vertically reciprocating member 12. Also fixed to base member 11 is a suitable optical system 12c so that a human operator can see the relative positions of the pointer 12b and the scale 11c and detect the deflection of the deflection of the vertically reciprocating member 12, and thereby determine the weight of the applied load.

As will hereinafter be illustrated, with respect to FIGS. 5 and 6, the embodiment illustrated in FIG. 2 employs a pair of parallelograms at either end of the load support means 13, and a total of eight torsion bars. In addition, base number 11 is now a horizontal support member designed to support the parallelogram on a flat table top surface. Extending upwardly from base 11 are a pair of fixed base links 11b and 11c (see FIG. 6). They define the fixed base side of the parallelogram for the embodiment illustrated in FIGS. 2, 5 and 6.

Figure 3:
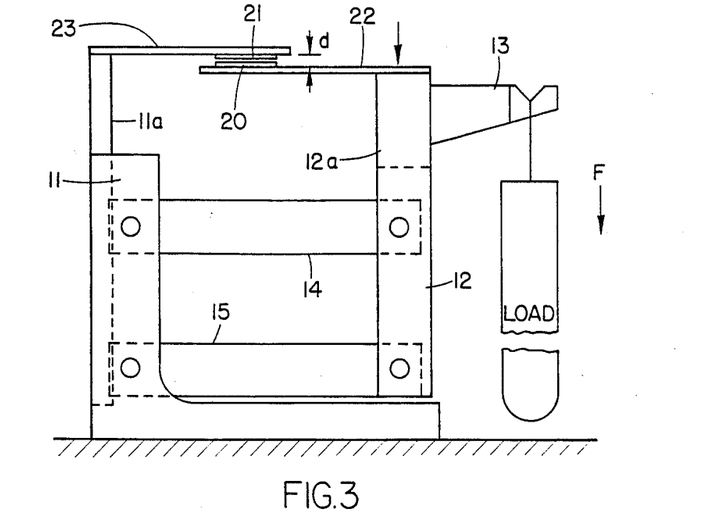
FIG. 3 is side elevation view of a third embodiment of the present invention.

The embodiment illustrated in FIG. 3 likewise uses an arrangement of capacitor plates 20, 21 wherein the distance d increases in response to the loading of the load receiving member 13. The horizontal support member 23 is attached to an extension 11a of the base member 11. The horizontal support 22 is attached to an extension 12a of the vertically reciprocating link 12.

As can be seen from a comparison of FIG. 1 and FIG. 2, the parallelogram support means can be configured to be mounted on a vertical support such as a wall as illustrated in FIG. 1, or as a table mounted device as illustrated in FIG. 2.

In each of the embodiments illustrated in FIGS. 1 through FIG. 3, a loading of the load receiving member 13 creates a downward vertical movement of reciprocating link 12. By virtue of the parallelogram, the movement of link 12 is parallel to the base support 11. Inasmuch as the horizontal support means 22, 23 are cantilevered at 90° angles, the capacitor plates 20, 21 will always be maintained parallel to one another as the weighing mechanism is loaded.

Figure 5:
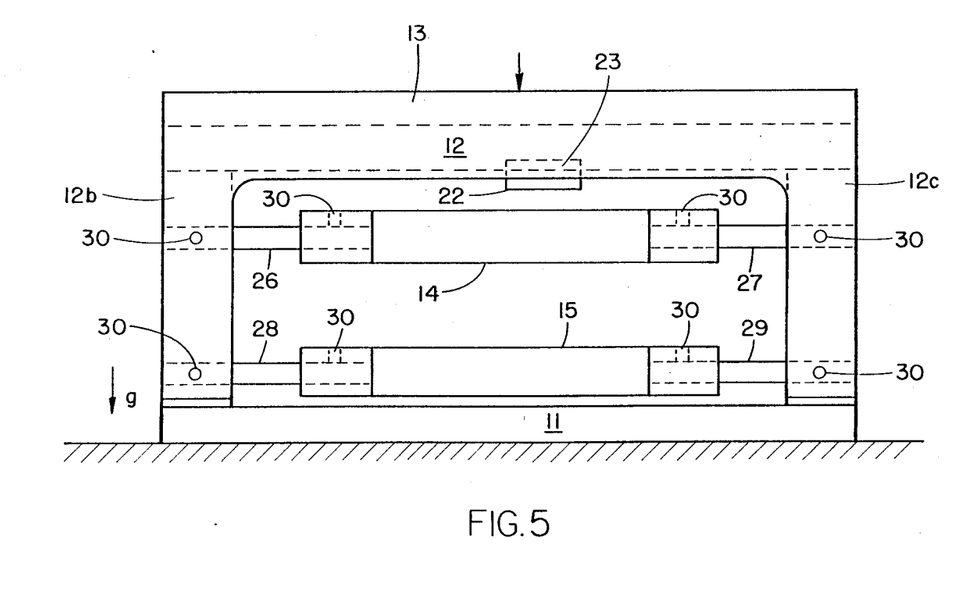
FIG. 5 is a front elevation view of the embodiment illustrated 2.
Figure 6:
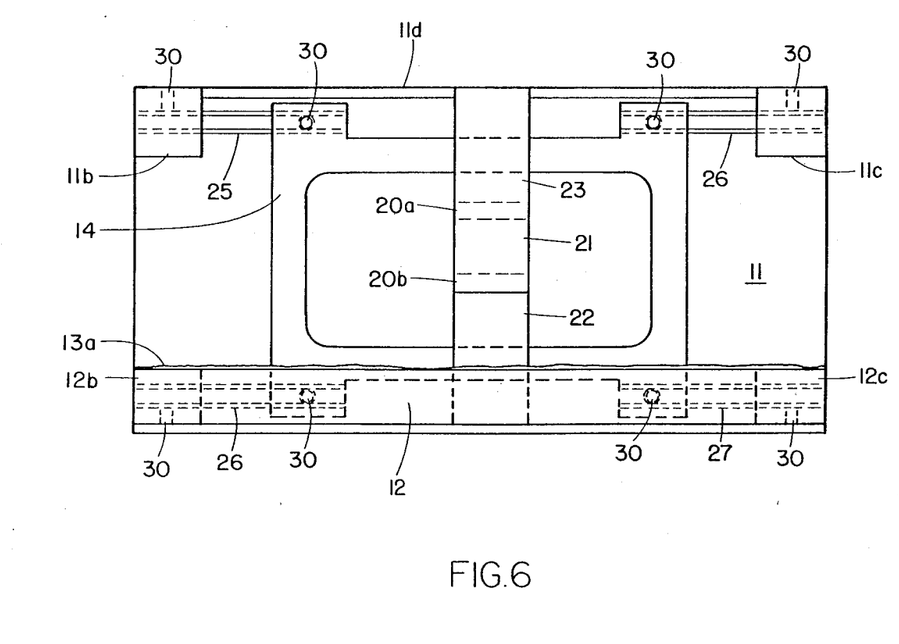
FIG. 6 is a top plan view of the embodiment illustrated in FIG. 2.

The preferred embodiment of the invention illustrated as an elevation end view in FIG. 2, is illustrated as an elevation front view in FIG. 5, and as a top plan view in FIG. 6. The load receiving platform 13 has been removed in FIG. 6 in order to more clearly illustrate the construction of the invention.

Each of the movable links 14 and 15 comprises a rectangular link which forms a portion of a parallelogram on either end of each link. Link 14 is supported by four torsion bars, two of which are illustrated in plan view in FIG. 6 as 25, 26, and two of which are illustrated in hidden views as 26 and 27 in FIG. 6. Likewise, link 15 is also supported by four torsion bars, two of which are illustrated in FIG. 5 as 28 and 29 and two of which (not shown) underlie bars 25 and 26 as illustrated in FIG. 6. Each of the torsion bars is secured at each end by set screws 30 to the movable links, the base support and the reciprocating link. As illustrated in FIGS. 5 and 6, the base member 11 defines a planar base 11 resting on a table top or other support, and two upwardly extending legs 11b and 11c. The reciprocating link 12 is illustrated in FIGS. 5 and 6 as a vertical bifurcated member having a pair of legs 12b, 12c which extend downwardly to engage the torsion bars 26-29 as illustrated in FIG. 5. The load receiving member 13 is illustrated in hidden view in FIG. 5, and the removed portion of 13 is indicated by the breakaway line 13a in FIG. 6.

The horizontal support means 22 and 23 are illustrated in FIG. 6 as a pair of inwardly extending cantilevered arms attached to the base member 11 along support rib 11d. The horizontal support arm 22 is likewise attached to the underside of the vertically reciprocating link 12. As illustrated in exaggerated form in FIGS. 2 and 5, the capacitor plate 20 has a somewhat larger area than capacitor plate 21. This is to compensate for the lateral movement of the plates in response to the arc prescribed by the parallelogram movement. While the movable reciprocal link 12 remains parallel to the base support member 11b throughout its movement, it does transverse a very small lateral arc in its movement.

As illustrated in FIGS. 2-6, the torsion bars are hexagonal spring steel held in place with set screws 30. It should be noted that any type of torsion bar could be used as long as it is securely keyed or pinned in place to prevent rotation of the torsion bar within any of the pivotable joints. In addition, it is desirable that the spring rate for the torsion bar be selected in such a manner that the normal operating load to be encountered by the weighing mechanism lies within the linear response rate of the torsion spring.

Figure 7:
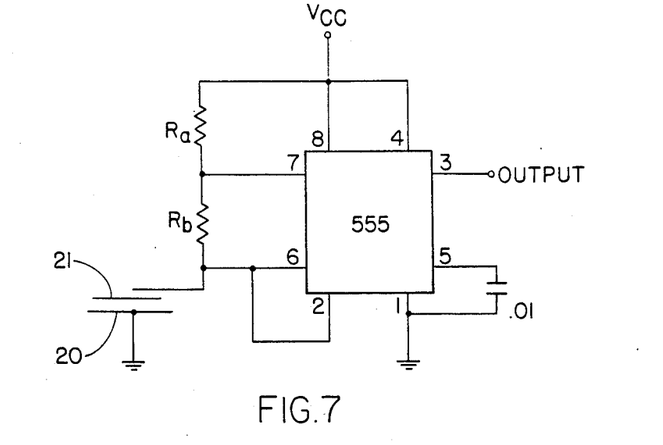
FIG. 7 is a schematic illustration of the capacitance transducer and astable multivibrator used in the present invention.
Figure 8:
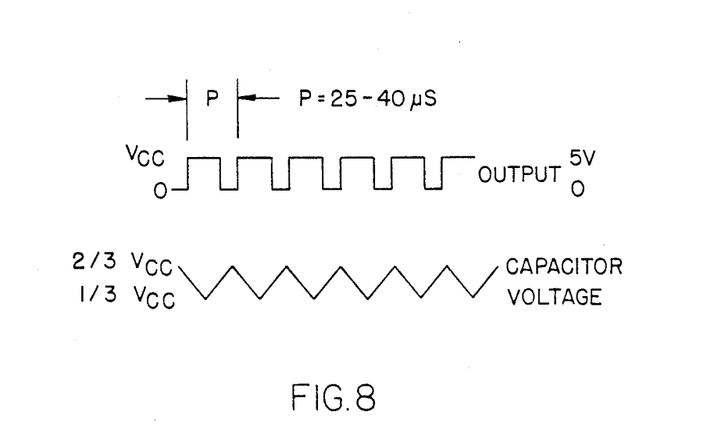
FIG. 8 is a diagrammatic representation of the output signals of the circuit illustrated in FIG. 7.
Figure 9:
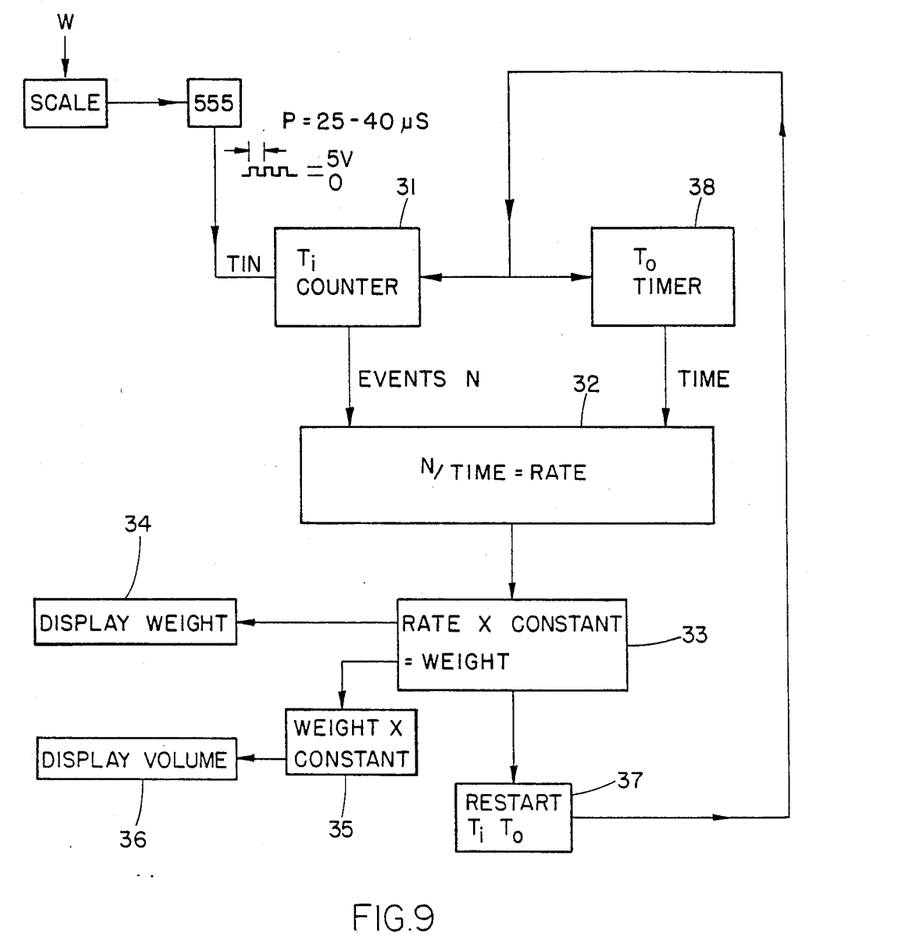
FIG. 9 is a block diagram of the microprocessor functions used in the present invention.

The electrical circuitry for the capacitance transducer is illustrated in FIGS. 7-9. FIG. 7 illustrates the "on board" circuitry, while FIG. 9 is a diagrammatic flow chart of the processing steps that take place in a microcomputor that supplies an input voltage to the capacitance scale, and receives back a pulse train indicative of the load being measured. In FIG. 7, a 555 timer chip available from National SemiConductor is connected to capacitor plates 20 and 21 as an astable multivibrator or square wave clock. The timing resistor is split into two sections $R_a$ $R_b$ with the discharge transistor of the 555 chip connected to the junction of $R_a$ $R_b$. A five volt power supply is connected at $V_{cc}$, and the capacitance transducer 20, 21 will begin to charge until it reaches ⅔rds of $V_{cc}$ through $R_a R_b$. When the ⅔rds $V_{cc}$ point is reached, the upper comparator triggers the flip-flop and the capacitor starts to discharge towards ground through $R_b$. When the discharge reaches ⅓rd $V_{cc}$, the lower comparator is triggered and a new cycle is started. The capacitor voltage and the output pulse train period P of the 555 chip are illustrated in FIG. 8. It should be noted that in the embodiment illustrated in FIGS. 2, 5 and 6, the capacitance between plates 20, 21 is inversely proportional to the distance d. Thus, the frequency output of the 555 timer chip is inversely proportional to the capacitance of the timing capacitor. Thus, if the capacitor plates 20, 21 are used as the timing capacitor for the 555 timer chip, the frequency output of the 555 timer will be directly proportional to the distance d, and the deflection due to the applied load w on the load receiving member 13. For the embodiment illustrated in FIGS. 2, 5 and 6, a period P, measuring the start of successive pulses in the pulse train output, ranged from 25 to 40 microseconds for a load between 0 and 2 kilograms. The capacitance transducer had an effective area of 2 square inches, with a spacing of 0.005 inches, at rest.

As illustrated in FIG. 9, the pulse train output which provides an output indicative of the number of pulses perinterval of time. The number of events or pulses is then divided by time at 32 to provide a rate which is multiplied by a given constant at 33 to determine the weight of the article placed on the load support means 13. The weight is then displayed at 34. Alternately, the weight is multiplied by a second constant to determine the volume of the collected plasma. An automatic and manual restart loop is provided at 37. The restart loop, timer 38 and the event counter 31 provide a continuously updated display of weight and volume as indicated at 34 and 36. The restart means may automatically redisplay the weight at any given selected interval, or upon demand. Additionally, the weight and volume display may be displayed on two separate output devices, or may be alternately displayed, for a given period of time. In addition, an additional counter and rate divider may be employed to detect and signal any substantial change in the amount of the substance being collected. Thus, if the rate of collection of the substance being collected should suddenly change, an alarm could be triggered signaling the operator to check for malfunction of the collection system.

While the present invention has been described with respect to the 555 timing chip, it would be apparent to those skilled in the art, that any variable capacitance, variable oscillatory circuit could be employed to provide essentially the same information. Alternately, the change in capacitance between plates 20 and 21 could be converted by traditional capacitance measuring devices into a DC analog signal for a direct meter readout of the weight received by load receiving member 13. This type of circuitry would be particularly useful for a stand alone scale not connected to a microprocessor or other data processing device.

Finally, it should be noted that the construction illustrated in FIGS. 2-6 provides a sturdy and simple device which is economical to construct, and which provides a high degree of linear response that may be precisely measured with a capacitance trasducer or other means such as a linear-variable-differential-transformer, optical sensor or strain gauge mounted on the torsion bars. Any overloading of the load support member 13 will cause the vertical reciprocating member 12 to bottom out on base member 11, thereby preventing any overflexure of the torsion springs. While a torsion bar has been provided at each one of the pivotable joints 16-19, it is apparent that a fewer number of torsion bars could be employed. While it would not be expedient to do so from a reliability standpoint, the device could be contructed with single torsion bars at one pivotable joint, with the remaining three joints being freely pivoting. By altering the number of torsion bars, and their spring flexure rate, one is easily able to adapt the device to a wide range of sensitivity measurements.

It is apparent from the foregoing that an accurate, durable and economical weighing device has been described. While certain presently preferred embodiments have been described in detail with respect to a specific application, it will be apparent to those familiar with the art that certain changes and modifications could be made without departing the scope of the invention, which is defined by the following claims.

I claim:

1. A weighing mechanism, said mechanism comprising:
   (a) a parallelogram support means, said means having a fixed base link, an opposing reciprocating link and two movable connecting links, said means also having four pivotable joints connecting said links,
   (b) a means for receiving a load to be weighed attached to said reciprocating link opposite said base link, one dimension of said parallelogram being altered as said load is received,
   (c) at least one torsion bar mounted at one of said movable joints between two adjacent links, said torsion bar resiliently supporting said parallelogram and being rotatably deformed in response to said load,
   (d) transducer means responsive to a change in the dimension being altered to provide an indication of the weight of the load received.

2. A weighing mechanism as claimed in claim 1, wherein separate torsion bars are provided for each pivotable joint, each of said torsion bars being secured to adjacent links.

3. A weighing mechanism as claimed in claim 1, wherein said torsion bar is secured at a first end to said base link and at a second end to a movable link.

4. A weighing mechanism as claimed in claim 1, wherein the reciprocating link opposite said base member is displaced by said load a distance that is directly proportional to the weight of said load.

5. A weighing mechanism as claimed in claim 1 or 2 or 3 or 4 wherein said transducer means further comprises variable capacitance plates, wherein said change in the dimension of the parallelogram varies the distance between said plates.

6. A weighing mechanism as claimed in claim 5, wherein said means for receiving a load to be weighed further includes a cantilevered means which extends over said parallelogram support means.

7. A weighing mechanism as claimed in claim 5 wherein said variable capacitance load transducer varies the output frequency of a variable oscillator to provide a variable frequency signal indicative of weight.

8. A weighing mechanism as claimed in claim 5 wherein said variable capacitance load transducer varies the output frequency of an astable multivibrator.

9. A weighing mechanism as claimed in claim 8 wherein the output of the multivibrator is divided by time and multiplied by a first constant to obtain a weight signal.

10. A weighing mechanism as claimed in claim 9 wherein the weight signal is multiplied by a second constant to obtain a signal indicative of volume.

11. A weighing mechanism, said mechanism comprising:
(a) a parallelogram support means, said means having a fixed base link, an opposing reciprocating link and two movable connecting links, said means also having four pivotable joints connecting said links,
(b) a means for receiving a load to be weighed attached to said reciprocating link opposite said base link, one dimension of said parallelogram being altered as said load is received,
(c) at least one torsion bar mounted at one of said movable joints between two adjacent links, said torsion bar resiliently supporting said parallelogram and being rotatably deformed in response to said load,
(d) indicator means responsive to the displacement of the parallelogram links to provide an indication of the weight of the load received.

12. A weighing mechanism as claimed in claim 11, wherein separate torsion bars are provided for each pivotable joint, each of said torsion bars being secured to adjacent links.

13. A weighing mechanism as claimed in claim 11, wherein said torsion bar is secured at a first end to said base link and at a second end to a movable link.

14. A weighing mechanism as claimed in claim 11, wherein the reciprocating link opposite said base member is displaced by said load a distance that is directly proportional to the weight of said load.

15. A weighing mechanism as claimed in claims 11 or 12 or 13 or 14 wherein said indicator means is an optical readout device.

* * * * *